United States Patent [19]

Tokhadze

[11] 4,249,806
[45] Feb. 10, 1981

[54] METHOD AND SYSTEM OF DESIGNING A PROJECT

[76] Inventor: Joseph Tokhadze, 21 W. 86th St., Apt. 1501, New York, N.Y. 10024

[21] Appl. No.: 79,301

[22] Filed: Sep. 26, 1979

Related U.S. Application Data

[63] Continuation-in-part of Ser. No. 896,391, Apr. 14, 1978, abandoned.

[51] Int. Cl.³ .................. G03B 15/00; G03B 33/06; G03B 21/26
[52] U.S. Cl. .................................. 353/30; 353/31; 353/84
[58] Field of Search .......................... 353/30, 31, 84

[56] References Cited

U.S. PATENT DOCUMENTS

| | | | |
|---|---|---|---|
| 3,551,042 | 12/1970 | Brink et al. | 353/30 |
| 3,553,358 | 1/1971 | Lauer | 178/DIG. 22 |
| 3,768,898 | 10/1973 | Yost | 353/31 |

Primary Examiner—Steven L. Stephan
Attorney, Agent, or Firm—Ilya Zborovsky

[57] ABSTRACT

A method of and a system for designing a project include forming a plurality of detail images representing details of the project in miniature form, projecting the detail images on a common screen to superimpose them and to thereby produce on the common screen a composite display of the project in miniature form, varying optical parameters including color of the detail images so as to produce a plurality of composite displays with different sets of optical parameters, selecting the composite display with ultimate set of optical parameters, measuring the optical parameters of this set, transforming the thus-measured optical parameters in accordance with laws of transformation into corresponding optical parameters of the full scale project, and producing the latter based upon the transformed optical parameters so as to obtain the full scale project with ultimate set of optical parameters for the same.

10 Claims, 3 Drawing Figures

METHOD AND SYSTEM OF DESIGNING A PROJECT

CROSS REFERENCE TO A RELATED APPLICATION

The present application is a continuation-in-part of the parent application Ser. No. 896,391, filed on Apr. 14, 1978 now abandoned.

BACKGROUND OF THE INVENTION

The present invention relates to a method of and a system for producing lighting and color compositions of actual or planned projects, generally of the interior or the exterior of an architectural structure, but also for a stage, film or television sets, and composites which are useful in the design of proposed lighting and color compositions.

In the design of architectural structures, e.g. building interiors and exteriors, it has been the practice heretofore for the architect himself or an architectural illustrator associated with the architect to produce a plurality of color plates for models showing the finished structure in a miniature or otherwise readily visualizable form to enable the planners to select the best organization of color, lighting and composition, for the particular project.

The known methods have the following disadvantages. The production of numerous illustrations is a time consuming and expensive operation. The color plates or sketches cannot exactly represent the distribution of lighting corresponding to that of the object to be designed, inasmuch as paints make possible to show colors only within the range of 25-fold deviation of luminances. Laws of quantitative transition from the optical parameters of the color plate or model into those of an object, have not been determined. Therefore, an artistic or designing concept of color-lighting composition selected on the model does not result in the identical perception of the object designed in accordance with this model. Moreover, the observation of the color plates or sketches in accordance with the known methods does not provide for conditions which are identical to the conditions in which the real object is generally observed.

SUMMARY OF THE INVENTION

Accordingly, it is an object of the present invention to provide a method of and system for designing a project with desired color and lighting, which avoids the disadvantages of the prior art.

More particularly, it is an object of the present invention to provide a method of and a system for desiging a project, which eliminate the need for the time-consuming drawing of numerous illustrations and/or the time consuming construction of small scale models, but which nevertheless permit the final project parameters to be determined in a scientific and accurate manner.

In keeping with these objects and with others which will become apparent hereinafter, one feature of the present invention resides, briefly stated, in a method which includes the steps of forming a plurality of detail images representing details of a project in a miniature form, projecting the detail images on a composite screen so as to superimpose them and to thereby produce on the common screen a composite display of the project in miniature form, varying parameters including colors of the projections of the detail images independently and separately from one another to impart to the composite display different sets of optical parameters to thereby produce a plurality of composite displays with differing sets of optical parameters and to thereafter select one of said composite displays with an ultimate set of optical parameters on the common screen, transforming the set of parameters from the common screen by laws of transformation into corresponding parameters of the full scale project, and producing the full scale project from the thus-transformed parameters so as to obtain the full scale project with ultimate set of optical parameters for the same.

Another feature of the present invention is to provide a system for desiginging a project, which includes a plurality of means each operative for performing a respective one of the steps of the above-described method.

When the method is performed and the system is constructed in accordance with the present invention, the image can be created using a screen so that a plurality of sketches or models are no longer needed. Brightnesses and colors of any element, background, fragment, or selected group can be varied, regardless of their locations and within a wide range. Color-lighting parameters of the display can be measured and then transformed so that the designed object provides for the perception which is identical to that selected during the process of modelling or observation of the common screen.

In accordance with still another feature of the present invention, the composite display on the screen is observed through an optical system which moves apart the eye axes of the viewer, so as to obtain an effect of presence. The varying step is performed on the grounds of the observation through this system. In such a method perception of the space on the screen or of the composite display is identical to the perception of the future object designed in accordance with the inventive method and by the inventive system.

The novel features which are considered to be characteristic for the present invention are set forth in particular in the appended clsims. The invention itself, however, as to its construction and method of operation, will be best understood from the following description taken with the following drawings.

DESCRIPTION OF A PREFERRED EMBODIMENT

Figure 1:
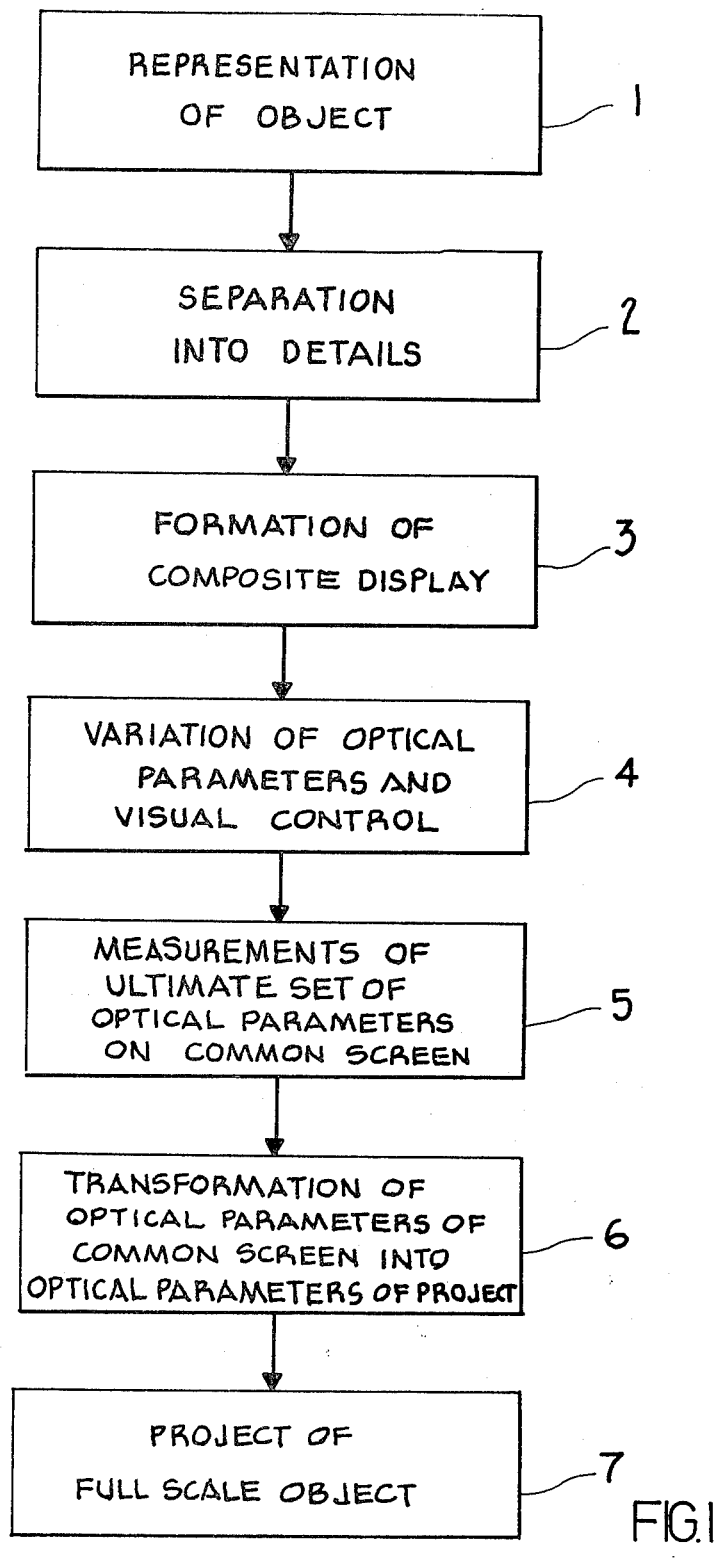
FIG. 1 is a block diagram illustrating the principles of the present invention.
Figure 2:
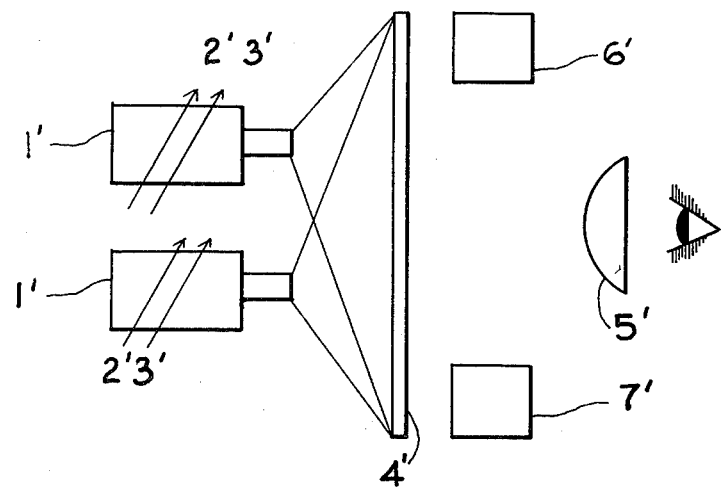
FIG. 2 is a system for desiging of a project in accordance with the present invention.

A method in accordance with the present invention is shown schematically in FIG. 1, whereas FIG. 2 illustrates a system implementing this method.

In accordance with the invention, detail images are first produced. An initial material representing an object is provided. The initial material may be formed, for example, as a black and white photograph, prospective sketch of the project to be designed and the like. The provision of the initial material is performed at 1. Then, the detail images are separated from the initial material at 2. The detail images may be formed by separate elements or groups of elements of the initial material.

Figure 3:
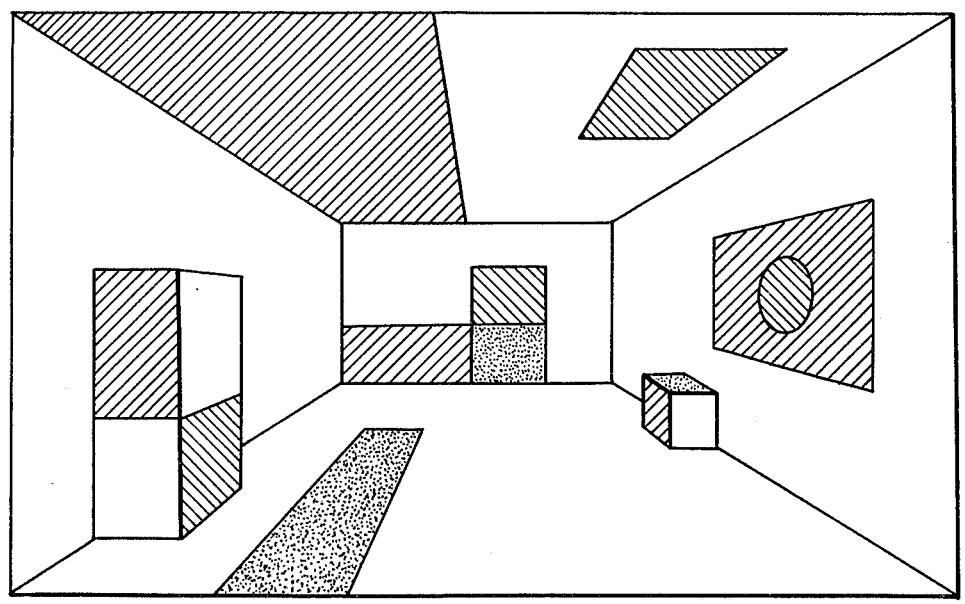
FIG. 3 is a view showing a composite display on a common screen of the inventive system.

Group here means a set of elements, regardless of their location, which have simultaneously identical color-lighting parameters. Various groups are shown in FIG. 3 on the screen as hatched by different hatching. The separation is performed by masking (drawing) of each element or group, and subsequant fixation of each masked element and group on a separate carrier, such as for example, a transparency. This is performed in a consecutive order in dependence upon the required number of elements or groups.

The above-mentioned masking may be performed on the intial material in the following manner. The sheet of paper with the image of the project to be designed is covered at its portions which are not to be photographed. Then, the remaining portions of the image is photographed and thereby the detail images are produced. It is also possible to utilize color filters. In this case, the initial material may be in the form of a color photograph or sketch. It is photographed in a consecutive order through different color filters so that a plurality of transparencies are produced each containing the respective element or group image. This may be performed by the projectors which are shown in the drawing and whose main functions will be explained hereinbelow.

On the other hand, the separation may be performed on the screen whose functions will also be explained hereinbelow. The initial material or more particularly the image of the project thereon, is projected onto the rear screen, the required group of the elements or the inidividual element is drawn fully within their contour on the screen by removable paint, then the projection is interrupted, and the remaining image on the screen is photographed. The above-mentiomed projectors may be utilized for photographing of the thus-separated groups or elements on the screen. Polaroid films may be utilized for photographing the separated elements or groups on the screen. Thus, a plurality of negatives or slides are produced each containing the image of a separate element or group of elements.

The elements or groups of elements are parts of a common image and they are situated at different locations of the same, as shown particularly in FIG. 3. The elements or the groups of elements may also be located not only laterally adjacent to one another, by pierce each other. The initial material, for example a photograph, carries an image of the project to be designed in a miniature form. This is, of course, true for detail images produced by the separation, which are also details of the project, in a miniature form. The separation may be performed with the aid of the projector 1' on the rear screen 4', as shown in FIG. 2.

The thus-produced detail images are projected through a plurality of the projectors 1' separately, so that each detail image is projected through a separate projector onto the common rear screen 4'. The detail images thereby form a composite display in a miniature form (at 3), as shown in FIG. 3. In this process, the detail images are superposed not only so that their contours coincide with each other, but also so that the details of one group fill free spaces (holes) of the detail images of the other group.

Then, the optical parameters of the detail images on the common screen 4' are varied (at 4), independently and separately from each other. More particularly, the optical parameters which are varied include color and brightness. In order to vary these parameters, each projector 1' is provided, for example with a light-regulating device, a diaphragm 2' or the like (for luminance or brightness adjustment), and with a color mixing device 3' (for color adjustment) similar to the devices utilized in enlargement-projectors. When the above-mentioned optical parameters are consecutively varied, the composite display on the common screen 4' is viewed through an optical system 5' providing for an effect of presence. This optical system may be formed by a semi-covex lens which moves the eye axes apart from each other. Despite the fact that the viewer observes the miniature projected display on the screen, it is perceived as an actual object because of this optical system, as if the viewer is located in a room so as to observe it from inside.

In addition to the above-mentioned optical system providing for the effect of presence, a rear screen is utlized, which also provides for the highly advantageous results. The utilization of the rear screen with the penetration of rays through the screen, provides for more effective perception of the depth of space than reflective surface screens.

When the optical parameters are consecutively varied, a plurality of composite displays with different sets of optical parameters are consecutively produced on the common rear screen 4', the composite displays representing the full scale project in a miniature form. The designer or viewer selects a composite display with an ultimate set of optical parameters which he considers corresponding to his concept of the final object. This is performed at 4.

After this, the optical parameters of the selected composite display are measured on the common screen 4'. The measurements may be performed by known measuring devices. For example, the brightness may be measured by brightness measuring devices 6', whereas the color may be measured by spectrophotometers 7' at 5.

The thus-measured optical parameters on the common screen are then transformed into the parameters of the full scale project in accordance with laws of transformation which are proposed by the inventor, at 6. The inventor found a law of transformation of optical parameters of a model into the rsspective optical parameters of a full scale project. The transformation law which guarantees correspondnece of a full scale object to a model (or display on the screen) is that the brightness contrasts of the model and the full scale object are proportional in accordance with the following formula:

$$B^k_{OR}/B_{bR} - 1 = M(B^k_{OM}/B_{bM} - 1),$$

wherein $B_{OR}^k$ and $B_{bR}$ are brightnesses of K object and background of a full scale project, respectively;

$B_{OM}^k$ and $B_{bM}$ are brightnesses of K object and background, on a model or screen, respectively; and M is a transformation scale or constant.

Since the brightness is perception of luminance, the relative brightnesses are determined from relative luminances in accordance with the following formula:

$$B_o/B_b = 0,53 \ln(1 + 5.6 \, L_o/L_b),$$

wherein $B_o$ and $B_b$ are brightnesses of the object and background, respectively; and $L_o$ and $L_b$ are luminances of the object and background m, respectively, measured in cd/m².

The transformation of the set of optical parameters on the screen into the corresponding parameters of the full scale project may be performed by calculations in accordance with the above-presented laws of transformation. On the other hand, it may be performed autmatically by a computer. In this case, the law of transformation is introduced into a memory of the computer as a program, the output signals produced by the measuring devices are introduced into the input of the computer and transformed there in accordance with the law of transformation, and the thus-produced output data are received from the output of the computer as a set of optical parameters of the full scale project. Well known computers may be utilized for this step. A computer may also be utilized for both measuring the optical parameters on the screen and transforming them in accordance with the law of transformation into the optical parameters of the full scale project.

Finally, the thus-produced optical parameters are utlized for production of a full scale project at 7. The transformed parameters are utilized as initial date for designing of illumination and colors of the full scale object.

It is also possible to test the project which has been designed in a conventional way without the utilization of the inventive method. It may be performed in the following way. The respesentation of an object taken from the project thereof, is separated into detail images and the latter are projected on the common rear screen as disclosed hereinabove, similarly to the steps 1, 2 and 3. Then, the optical parameters of the project are transformed in accordance with the law of transformation in reverse order into the optical parameters for a common screen. These optical parameters are introduced onto the screen. A designer observes the screen display of the project in a miniature form. If he is satisfied, this means that the project tested has been developed properly. If he is not satisfied, the steps 4–7 are repeated, and the new corrected data of the optical parameters are received, whereby the project is corrected.

Thus, the inventive method and system carries out the production of the composite display in a miniature form on the common rear screen, the independent and unlimited variations of optical parameters of the detail images of this composite display so as to produce a plurality of composite display with different optical parameters, the selection of the optimum set of the optical parameters on the screen and thereby the selection of the composite display with the optimum set of optical parameters by observation of the screen in condition of perception corresponding to that of the observation of the full scale object, the measurement of the optical parameters on the screen of the selected displays and transformation the same in a special way in accordance with the law of transformation so that the parameters are obtained which guarantee that the object designed with the utilization of these parameters will be viewed similarly to the perception on the common screen during the process of modelling.

It will be understoood that each of the elements described above, or two or more together, may also find a useful application in other types of constructions differing from the types described above.

While the invention has been illustrated and described, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of the present invention.

What is claimed as desired to be protected by Letters Patent is set forth in the appended claims:

1. A method of designing of project, such as a structural exterior or interior, motion picture, stage or television set or the like, comprising the steps of
   forming a plurality of detail images representing details of said project in miniature form;
   projecting said detail images on a common screen so as to superimpose them and to thereby produce on said common screen a composite display of said project in miniature form;
   varying parameters including colors of the projections of said detail images, independently and separately from one another to impart to said composite display different sets of optical parameters to thereby produce a plurality of composite displays with different sets of optical parameters and to thereafter select one of said composite displays with an ultimate set of optical parameters on said common screen;
   transforming said set of optical parameters from said common screen by laws of transformation into corresponding parameters of the full scale project, said transforming step including transforming in accordance with the following formula:

$$B^k_{OR}/B_{bR} = 1 - (B^k_{OM}/B_{bM} - 1),$$

wherein
   $B_{OR}{}^k$ and $B_{bR}$ are brightnesses of K object and background of a full scale project, respectively,
   $B_{OM}{}^k$ and $B_{bM}$ are brightnesses of K object and background, on a model or screen, respectively, and
   M is a transformation constant; and
   producing the full scale project from the thus-transformed parameters so as to obtain the full scale object with ultimate set of optical parameters for the same.

2. A method as defined in claim 1, wherein said transforming step includes providing a computer, introducing into said computer a program corresponding to said laws of transformation, and performing said transformation automatically by said computer by introducing the ultimate set of optical parameters on said common screen into the input of said computer and obtaing the ultimate set of optical parameters of the full scale project in the output of said computer.

3. A method as defined in claim 1; and further comprising the step of observing said composite display through an optical system which moves apart the eye axes so as to obtain an effect of presence, said observing step being performed after said projecting step so that said varying step is performed based upon said observing step.

4. A methid as defined in claim 1, wherein said forming step includes providing an initial material representing said full scale project, masking details of said initial material, and fixing of the thus-masked details in consecutive order to as to form a plurality of said detail images.

5. A method as defined in claim 1, wherein said forming step includes forming such detail images which while being projected on said common screen, overlap each other so that one of said detail images are located in a hole of another of said detail images.

6. A method as defined in claim 1, wherein said projecting step includes projecting of said detail images on said common screen which is a transparent rear screen.

7. A method as defined in claim 1, wherein said forming step includes providing an initial material representing said full scale project, projecting it through a projector on the same common screen, masking said details provided in said initial material on said common screen, and photographing the thus-masked details on said common screen so as to produce said detail images.

8. A method as defined in claim 7, wherein said step of projecting of said detail images on said common screen includes projecting the same through a plurality of projectors, said step of projecting said initial material being performed by projecting the same through one of said projectors.

9. A method as defined in claim 7, wherein said photographing step is performed through said projector.

10. A system for designing a project, such as a structural exterior or interior, motion picture stage or television set or the like, comprising
   means for forming a plurality of detail images representing details of the project in miniature form;
   a screen;
   means for projecting said detail images on said screen so as to superimpose them and to thereby produce on said screen a composite display of the project in miniature form;
   means for varying parameters of the projections of said detail images, independently and separately, from one another to impart to said composite display different sets of optical parameters to thereby produce a plurality of composite displays with different sets of optical parameters and to thereafter select one of said composite displays with an ultimate set of optical parameters on said screen; and
   means for transforming said set of optical parameters from said common screen by laws of transformation in accordance with the following formula $$B^k_{OR}/B_{bR} = 1 - (B_{OM}^k/B_{bM} - 1);$$

wherein
   $B_{OR}^k$ and $B_{bR}$ are brightnesses of K object and background of a full scale project, respectively,
   $B_{OM}^k$ and $B_{bM}$ are brightnesses of K object and background, on a model or screen, respectively, and
   M is a transformation constant,
so as to transform said set of optical parameters from said common screen into corresponding parameters of the full scale project to produce the latter with ultimate set of optical parameters for the same.

* * * * *